United States Patent
Janz

[19]

[11] Patent Number: 6,125,047

[45] Date of Patent: Sep. 26, 2000

[54] REGULATED INVERTING POWER SUPPLY

[75] Inventor: Donald W. Janz, Oklahoma City, Okla.

[73] Assignee: Seagate Technology, Inc., Scotts Valley, Calif.

[21] Appl. No.: 08/182,201

[22] PCT Filed: Dec. 14, 1993

[86] PCT No.: PCT/US93/12178

§ 371 Date: Jun. 11, 1996

§ 102(e) Date: Jun. 11, 1996

[87] PCT Pub. No.: WO95/17036

PCT Pub. Date: Jun. 21, 1995

[51] Int. Cl.$^7$ .................................................... H02M 3/18
[52] U.S. Cl. .................................................. 363/60; 363/59
[58] Field of Search ........................ 363/59, 60; 307/110; 327/536, 537

[56] References Cited

U.S. PATENT DOCUMENTS

| 3,657,634 | 4/1972 | Eastop . |
| 3,708,742 | 1/1973 | Gunn . |
| 3,772,582 | 11/1973 | Martin . |
| 3,860,864 | 1/1975 | Fitz . |
| 3,863,139 | 1/1975 | Williams . |
| 4,028,559 | 6/1977 | Larner . |
| 4,030,022 | 6/1977 | Bird . |
| 4,093,980 | 6/1978 | Gurwicz . |
| 4,164,014 | 8/1979 | Crowe, et al. . |
| 4,225,913 | 9/1980 | Bray . |
| 4,274,132 | 6/1981 | Molyneux-Berry . |
| 4,389,702 | 6/1983 | Clemente, et al. . |
| 4,395,647 | 7/1983 | Morong, III . |
| 4,502,152 | 2/1985 | Sinclair . |
| 4,535,410 | 8/1985 | O'Mara . |
| 4,636,930 | 1/1987 | Bingham et al. ......................... 363/60 |
| 4,679,134 | 7/1987 | Bingham, et al. . |
| 4,686,615 | 8/1987 | Ferguson . |
| 4,777,577 | 10/1988 | Bingham, et al. . |
| 4,797,899 | 1/1989 | Fuller . |
| 4,807,104 | 2/1989 | Floyd, et al. . |
| 4,809,152 | 2/1989 | Bingham, et al. . |
| 4,888,677 | 12/1989 | Grimm et al. ........................... 363/60 |
| 4,897,774 | 1/1990 | Bingham, et al. . |
| 4,942,509 | 7/1990 | Shires, et al. . |
| 4,942,510 | 7/1990 | Edwards . |
| 4,985,662 | 1/1991 | Willcocks, et al. . |
| 4,999,761 | 3/1991 | Bingham, et al. . |
| 5,008,799 | 4/1991 | Montalvo ................................ 363/60 |

(List continued on next page.)

FOREIGN PATENT DOCUMENTS

0 257 810 A2 2/1988 European Pat. Off. .
0 489 412 A2 10/1992 European Pat. Off. .

OTHER PUBLICATIONS

Data Sheet for Switched–Capacitor Voltage Converter With Regulator; LT1054; Texas Instruments Data Book; August, 1991.

*Primary Examiner*—Adolf Deneke Berhane
*Attorney, Agent, or Firm*—Crowe & Dunlevy

[57] ABSTRACT

An inverting power supply (10) having first and second charging capacitors (22, 24) that are alternately connected to a positive power source (12) and a negative output terminal (18) which is to be maintained at a negative voltage with respect to a common ground for the power source and the power supply. Switches (34, 36) connect a positive plate of each charging capacitor to the power supply positive terminal during alternate half cycles of a two-phase clock (20) and charge is bled from the positive plates by switching transistors (46, 50) during the other half cycle to enable charge to be transferred via diodes (52, 54) from the negative output terminal to negative plate of the charging capacitors during the other half cycle. The base-emitter currents of the switching transistors are controlled by a charge transfer control circuit (56) in relation to the voltage at the negative output terminal to regulate the voltage at the negative output terminal by controlling the rate of charge transfer to the negative output terminal. Additional regulation can be provided by a current control circuit (106) that adjusts the switching transistor base-emitter currents in relation the collector currents of the switching transistors.

4 Claims, 2 Drawing Sheets

U.S. PATENT DOCUMENTS

| | | | |
|---|---|---|---|
| 5,051,882 | 9/1991 | Grimm, et al. | |
| 5,095,223 | 3/1992 | Thomas | |
| 5,159,543 | 10/1992 | Yamawaki | 363/60 |
| 5,179,535 | 1/1993 | Nakayama | |
| 5,218,235 | 6/1993 | Patterson, et al. | |
| 5,224,130 | 6/1993 | Mayo, et al. | |
| 5,606,491 | 2/1997 | Ellis | 363/60 |
| 5,623,222 | 4/1997 | Tamagawa | 327/259 |
| 5,668,710 | 9/1997 | Caliboso et al. | 363/60 |
| 5,712,777 | 1/1998 | Nicollini et al. | 363/60 |
| 5,764,501 | 6/1998 | Limpaecher | 363/61 |
| 5,828,560 | 10/1998 | Alderman | 363/60 |
| 5,914,632 | 6/1999 | Fotouhi et al. | 327/537 |

REGULATED INVERTING POWER SUPPLY

BACKGROUND OF THE INVENTION

1. Field of the Invention

The present invention relates generally to improvements in power supplies and, more particularly, to power supplies that utilize switched capacitors to generate negative output voltages from positive voltage sources.

2. Brief Description of the Prior Art

Inverting power supplies that generate negative voltages from a positive power source are used for a variety of purposes and it has long been known that a negative voltage can be generated using a capacitor that is switched between a power source, that provides a positive voltage with respect a system ground, and an output terminal that is to be maintained at a negative voltage with respect to the system ground. However, it has been found that conventional inverting power supplies constructed using this approach have shortcomings that limit their use in particular applications or require undesirable tradeoffs in adapting them to particular applications.

A problem that has arisen in the use of magneto-resistive read heads in disc drives that store computer files has highlighted these shortcomings. A magneto-resistive head senses magnetic fields adjacent surfaces of rotating discs of the disc drives by measuring the voltage necessary to maintain a constant current through a magneto-resistive element of the head. The magnetic fields are produced by flux transitions, corresponding to logical 1's in data stored by the disc drive, along data tracks in magnetizable surface coatings formed on the discs. Thus, by detecting peaks in the magnetic field adjacent a disc surface, the stored data can be recovered.

The problem that has arisen with the use of these heads in a disc drive is that maintaining a current through the magneto-resistive element can result in a build-up of electrostatic charge on the head and such electrostatic charge can result in arcing between the head and the disc surface. The arcing vaporizes small amounts of the surface coating and the vaporized material can collect on the heads to interfere with the reading of data from the discs.

The electrostatic charge build-up arises from the combination of the relative motion between the disc surfaces and head and the use of power supplied by a computer with which the disc drive is used. This power, usually supplied at 5 volts with respect to a common ground for both the computer and the disc drive places the magneto-resistive head at a positive voltage with respect to the discs which are commonly grounded. Hence, because of the relative motion between the discs and the head, a charge can be built up on the head in much the same manner that a charge is built up in a Van de Graaf generator or a Wimhurst machine.

The problem presented by the build up of electrostatic charge on the heads of discs drives of this type can be overcome by providing the disc drive with an inverting power supply that produces a voltage that is negative with respect to the system ground, and returning the current through the magneto-resistive element to a negative output terminal at which this negative voltage appears. Thus, the magneto-resistive element can be maintained at substantially ground potential to prevent the heads from becoming charged.

Unfortunately, as noted above, conventional inverting power supplies have shortcomings which, though not so severe as to make them unusable, limit their value in compensating for the problem described above. Thus, for example, on a time scale corresponding to the passage of flux transitions on a data track by a read head, voltage regulation in conventional inverting power supplies takes place slowly so that some charge build up can occur despite the use of the inverting power supply. Moreover, ripple in the negative voltage supplied by the inverting power supply has the effect of introducing noise into the disc drive read channel, of which the magneto-resistive element is a part, and such noise can generate errors in the reading of a computer file from a disc. While these problems can be compensated by using large reservoir capacitors between the negative output terminal of the inverting power supply and the system ground, the use of large, and consequently bulky, capacitors in a disc drive is contrary to another desirable characteristic of a disc drive; specifically, small size that will permit a disc drive to take up little space in the case of a computer with which a disc drive might be used. Such size can be an important consideration in; for example, a lap top computer. Thus, the shortcomings of conventional inverting power supplies require a tradeoff between the extent to which the arcing problem is overcome and other desirable disc drive characteristics. Consequently, while conventional inverting power supplies can be used to minimize the arcing problem, they exact a price that limits their usefulness for this purpose.

SUMMARY OF THE INVENTION

The present invention provides an inverting power supply which uses only small capacitors to provide a well regulated, substantially ripple free negative voltage which can be used not only to solve the aforementioned arcing problem in disc drives employing magneto-resistive heads but, in addition, can be used in substantially any application in which a well regulated, low ripple negative supply voltage might be advantageous. To these ends, the power supply of the present invention is comprised of first and second charging capacitors that are charged from a power source that provides a positive supply voltage in alternate half cycles of a two phase clock for subsequent discharge, in the other half cycle for each capacitor, to a negative output terminal of the power supply to which a load can be connected. The switching of the capacitors from the positive power source to the negative output terminal is effected by a switching circuit that includes a charge transfer control circuit which senses the voltage at the negative supply terminal and adjusts the rate of charge transfer between the charging capacitors and the negative supply terminal in relation to the voltage at the negative supply terminal to maintain the voltage at the negative output terminal at a desired level. A small, filter capacitor between the negative output terminal and the system ground eliminates ripple that arises during the switching of the charging capacitors between charging and discharging modes.

An important aspect of the invention is that voltage regulation at the negative output terminal and ripple suppression is achieved by control of the transfer of charge between the charging capacitors and the negative output terminal to which a load; for example, a magneto-resistive head, may be connected. Thus, not only can drift in the voltage at the negative output terminal be rapidly compensated but the charging capacitors can be charged to a positive voltage that is considerably larger than the negative voltage at the negative output terminal to minimize the sizes of the charging capacitors. Moreover, since electrical charge is transferred between the negative output terminal and the charging capacitors at substantially all times, only a small filter capacitor will suffice to eliminate ripple in the voltage at the negative output terminal. Consequently, the present invention inherently provides a well regulated, substantially ripple free negative supply voltage-that is suitable for use not only to eliminate the aforementioned arcing problem in disc drives employing magneto-resistive heads but, additionally, is well suited for substantially any application in which a negative voltage might be generated from a power source which provides power at a positive voltage with respect to a system ground.

Moreover, the power supply of the present invention lends itself to even further voltage regulation and ripple minimization. In particular, the inverting power supply of the invention is well adapted to providing a well regulated, substantially ripple free negative voltage in circumstances in which the current through a load connected to the negative output terminal is subject to wide variations. To this end, and in an additional aspect of the invention, the rate of charge transfer can be sensed and used to bias the charge transfer control circuit so that the charge transfer control circuit need only compensate for small variations in the negative voltage supplied at the negative output terminal. In view of the rapidity of regulation provided by the control of charge transfer between the charging capacitors and the negative supply terminal that has been noted above, this additional feature will again result in increased regulation of the negative supply voltage to extend the range of applications in which the power supply of the present invention might be used.

A specific object of the present invention is to provide a well regulated, substantially ripple free inverting power supply that can be advantageously used to provide a negative supply voltage to the read channel of a disc drive employing magneto-resistive heads.

A further object of the invention is to provide an inverting power supply that can be used in a wide variety of applications requiring a well regulated, substantially ripple free negative voltage.

Another object of the invention is to provide a versatile inverting power supply that can be readily adapted to meet substantially any requirements that might be imposed by an application in which an inverting power supply might be used.

Other objects, features and advantages of the present invention will become apparent from the following detailed description when read in conjunction with the drawings and appended claims.

DESCRIPTION OF THE PREFERRED EMBODIMENT

Figure 1:
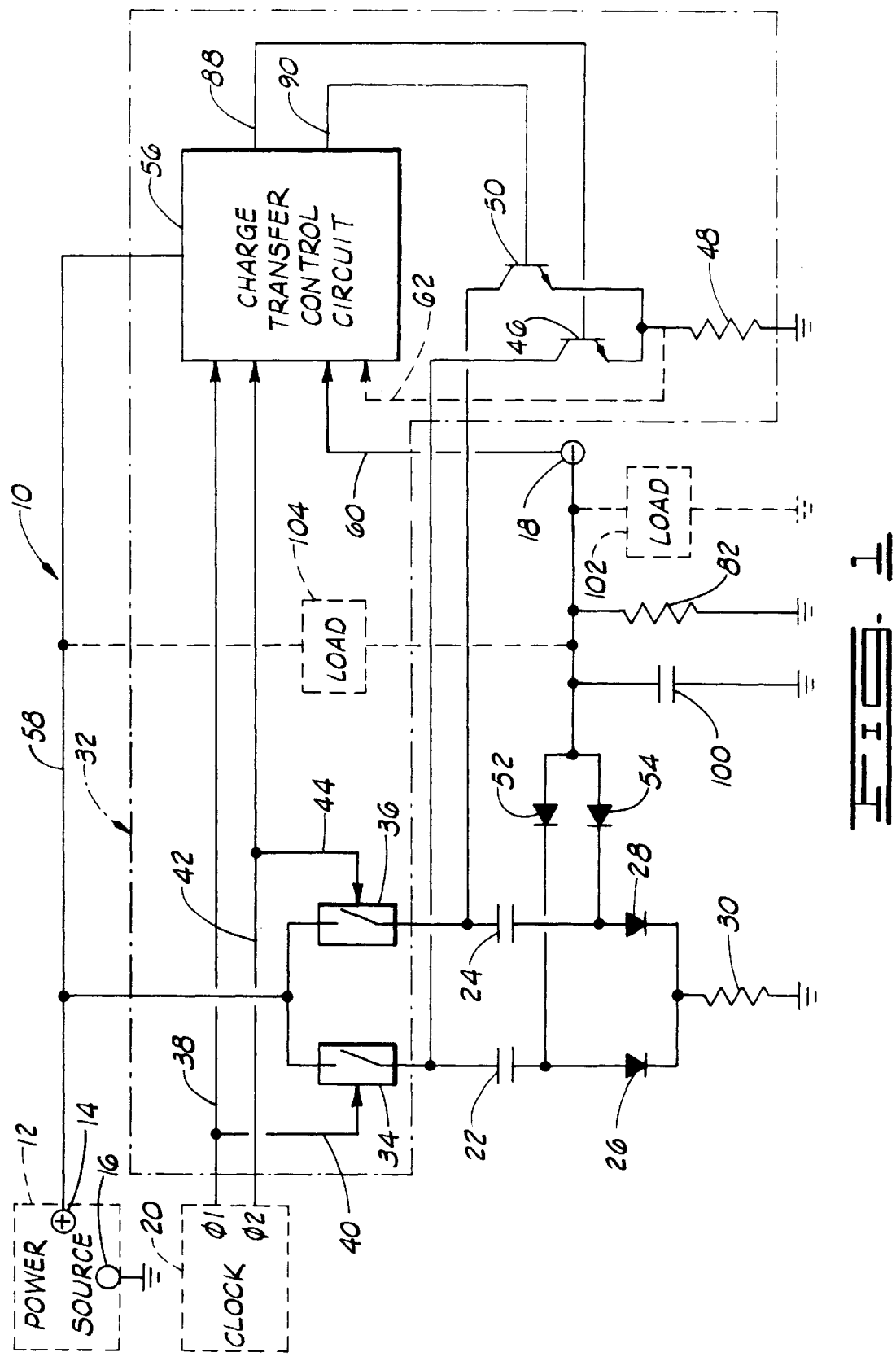
FIG. 1 is a circuit diagram of the inverting power supply of the present invention.

Referring now to the drawings in general and to FIG. 1 in particular, shown therein and designated by the general reference numeral 10 is an inverting power supply constructed in accordance with the present invention. In operation, the power supply 10 draws electrical power from a power source 12, that provides a positive voltage at a terminal 14 with respect to a ground terminal 16 that is connected to a ground for the power supply 10, to provide a negative voltage, with respect to the power supply ground, at a negative output terminal 18 to which a load; for example, a magneto-resistive head of a disc drive, can be connected. In such application, the terminals 14 and 16 would be pins of an electrical connector by means of which the disc drive is connected to a computer and the power source 12 would be the power supply of the computer.

As will be described below, the operation of the power supply 10 is carried out using clock signals and such signals can be provided by any suitable two phase clock 20. For example, the clock 20 can be a crystal controlled oscillator used to provide clock signals to microprocessors of which a disc drive is comprised and a frequency divider that reduces the oscillator frequency to a suitable range for controlling the operation of the power supply 10. As will be discussed below, the frequency of the clock 20 can be selected in relation to values of component used in the power supply 10 to optimize the operation of the power supply 10.

The power supply 10 is comprised of a first charging capacitor 22 and a second charging capacitor 24 each having one plate, referred to herein as the negative plate, that is connected to the power supply ground via a diode and a resistor. Specifically, the negative plate of the first charging capacitor 22 is connected to the anode of a diode 26, the negative plate of the second charging capacitor 24 is connected to the anode of a diode 28 and the cathodes of the diodes 26 and 28 connect to one end of a resistor 30. The other end of the resistor 30 is grounded.

As can be seen from the above connections of the charging capacitors 22 and 24 to the power supply ground, the charging capacitors 22 and 24 can be charged by connecting the other plates, referred to herein as the positive plates, of the capacitors 22, 24 to the positive terminal 14 of the power source 12. More particularly, with such a connection, the positive plates of the charging capacitors 22, 24 will become positively charged while the negative plates will become negatively charged, hence their designations.

As noted above, the frequency of the two phase clock can be selected in relation to components used in the construction of the power supply and a general criterion for the selection of the clock frequency is that the time constant of the RC circuit formed by either charging capacitor and the resistor 30 be of the same order of magnitude as the period of the clock 20. Such selection will cause each charging capacitor to charge to substantially the voltage at the positive terminal 14 during the operation-of the power supply 10 that will be described below while limiting the time the other charging capacitor is discharged to a load.

In addition to the charging capacitors 22, 24, the power supply 10 is comprised of a switching circuit 32 that, in turn, is comprised of normally open electronic switches 34 and 36 connected between the positive plates of the charging capacitors 22 and 24 respectively and the positive terminal 14 of the power source 12. One phase of the clock 20 is transmitted to the control input of the switch 34 via signal paths 38 and 40 and the second phase of the clock 20 is connected to the control input of the switch 36 via signal paths 42 and 44 so that, during operation of the power supply 10, the charging capacitors 22 and 24 are connected across the power source 12 terminals during alternate half cycles of operation of the clock 20.

The switching circuit 32 is further comprised of an npn first switching transistor 46, having a collector connected to the positive plate of the first charging capacitor 22 and an emitter grounded via a resistor 48, and an npn second switching transistor 50 having a collector connected to the positive plate of the second charging capacitor 24 and an emitter that is similarly grounded via the resistor 48. As will be discussed below, the first switching transistor 46 provides a current path for controllably discharging the positive plate of the first charging capacitor 22 to the system ground during the clock half cycle in which the switch 34 is open and the second switching transistor 50 similarly provides a current path for controllably discharging the positive plate of the second charging capacitor 24 when the switch 36 is open. Diodes 52 and 54, whose cathodes are connected to the negative plates of the charging capacitors 22 and 24 respectively and whose anodes are connected to the negative output terminal 18, provide a current path between the negative output terminal 18 and the negative plates of the charging capacitors 22, 24. Thus, the transfer of electrical charge between the charging capacitors 22, 24 and the negative output terminal 18, to maintain a constant negative voltage at the negative output terminal, can be controlled by controlling the discharge of the positive plates of the charging capacitors 22, 24.

The switching circuit 32 is further comprised of a charge transfer control circuit 56 that provides controlled base-emitter currents to the switching transistors 46 and 50 during the clock half cycles in which the switching transistors 46, 50 discharge the positive plates of the charging capacitors 22, 24 while turning the switching transistors 46, 50 off during the other clock half cycles. Thus, during each clock half cycle in which a charging capacitor 22, 24 is connected to the positive terminal 14 of the power source 12, the switching transistor, 46 or 50, whose collector is connected to the positive plate of the charging capacitor will be in a nonconducting state to permit a charge to be built up on the charging capacitor. In the other half cycle, in which the charging capacitor is disconnected from the positive terminal 14 of the power source, the switching transistor connected to the positive plate of the charging capacitor discharges such plate at a rate that is determined by the base-emitter current received from the charge transfer control circuit 56.

Figure 2:
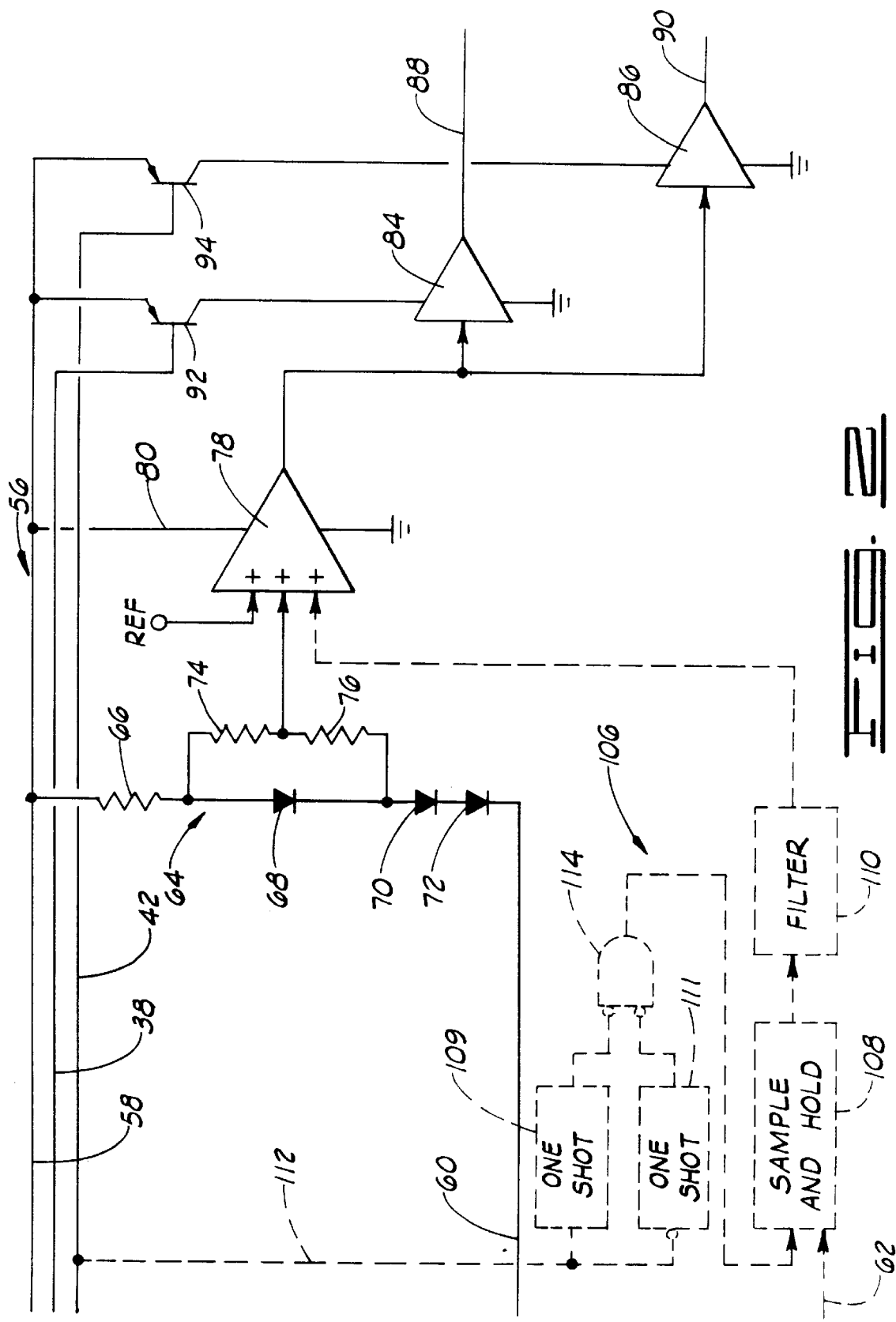
FIG. 2 is a circuit diagram of the charge transfer control circuit of the power supply of FIG. 1.

The charge transfer control circuit 56, more particularly shown in FIG. 2 receives electrical power at a positive voltage from the power source 12 via a conducting path 58 shown in FIG. 1 and carried into FIG. 2. Both phases of the clock 20, on signal paths 38 and 42, are transmitted to the charge transfer control circuit 56 and such signal paths have similarly been carried into FIG. 2. Additionally, the voltage at the negative output terminal 18 is supplied to the charge transfer control circuit 56 via a signal path 60 and, in an optional embodiment of the power supply 10 that will be discussed below, the voltage at the junction between the emitters of the switching transistors 46, 50 and the resistor 48 is transmitted to the charge transfer control circuit 56 via a signal path indicated in dashed line at 62 in FIG. 1 and carried into FIG. 2. As will be clear to those of skill in the art, such voltage will provide a measure of the current through either switching transistor 46, 50 at such times that the such transistor is conducting to, in turn, provide a measure of the rate at which electrical charge is being transferred to a load connected to the negative output terminal by whichever charging capacitor 22, 24 may be presently supplying power to the load.

Referring now to FIG. 2, the voltage at the negative output terminal 18 on the signal path 60 is received by a voltage level shifter generally designated by the numeral 64 and comprised of a resistor 66, connected in series with diodes 68, 70 and 72 between the conductor 58 from the positive terminal of the power source 12 and the signal path 60 from the negative output terminal 18, and a voltage divider comprised of resistors 74 and 76 that are connected in series across the diode 68. By selecting the number of the diodes of which the level shifter 64 is comprised and appropriate values for the resistors 74 and 76, the voltage at the negative output terminal 18 of the power supply 10 can be shifted to a value, the voltage at the negative output terminal 18 plus the forward voltage drops across the diodes, that is positive with respect to the power supply ground. Thus, the output voltage of the level shifter 64, at the junction of the resistors 74 and 76, will provide a measure of the voltage at the negative output terminal 18 that can be used as an input to an amplifier that is operated between the positive voltage supplied by the voltage source 12 and the common ground of the power source 12 and power supply 10. (As will be clear to those of skill in the art, the number of diodes of which the level shifter 64 is comprised can be selected to provide any positive voltage at the junction of the resistors 74, 76 in relation to the voltage at which the negative output terminal 18 is to be maintained. Thus, while only three diodes have been shown, it will be clear that such number is not limiting. Rather, any number of diodes can be used in the level shifter 64.)

The output of the level shifter 64 is transmitted to one input of a summing amplifier 78 which is operated using power supplied by the power source 12 to the positive power terminal of the amplifier 58 via the electrical conductor 58 and a conductor 80. The negative power terminal of the summing amplifier 78 is connected to the power supply ground which, as indicated above, is common to the power supply 10 and the power source 12.

A reference voltage is supplied to a second input of the summing amplifier 78 so that the output of the summing amplifier 78 reflects the sum of the shifted negative output terminal 18 voltage and the reference voltage. The reference voltage is selected to maintain a selected current through a ballast resistor 82 (FIG. 1) connected between the negative output terminal 18 and the power supply ground at such times that the voltage at the negative output terminal 18 is a value which is to be supplied to a load that is connected to the terminal 18.

Additionally, a third input to the summing amplifier 78 can be provided to include a bias in the output of the summing amplifier that will select a current to be received at the negative output terminal 18 at such times that the voltage at such terminal is the negative voltage that is to be provided by the power supply 10. This bias and circuitry by means of which it is achieved will be discussed below. The output of the summing amplifier 78 is connected to the inputs of driver amplifiers 84 and 86 which drive base-emitter currents through the switching transistors 46 and 50 respectively via conductors 88 and 90 shown in FIG. 2 and carried into FIG. 1. Like the summing amplifier 78, the driver amplifiers 84 and 86 are operated from a positive voltage supplied by the power source 12 on the conductor 58 leading to the power source positive terminal 14 as shown in FIG. 1. However, unlike the summing amplifier 78, the driver amplifiers 84 and 86 operate intermittently. More particularly, power is supplied to the driver amplifiers 84 and 86 via pnp transistors, 92 and 94 respectively, whose bases receive the clock phases on the signal paths 38 and 42 respectively so that the driver amplifiers 84, 86 will each be shut off during one half cycle of the clock 20. Consequently, the switching transistor 46 will be turned off during the half cycle in which the clock phase on the signal path 38 is high; that is, at such times that the clock phase on the signal path 38 closes the switch 34 that connects the positive plate of the charging capacitor 22, also connected to the collector of the switching transistor 46, to the positive terminal 14 of the power source 12. Thus, at such times that the first charging capacitor 34 is connected to the power source 12, the first switching transistor 46 is turned off to permit charges to build up on the plates of the first charging capacitor 22. At such times that the clock phase on the signal path 38 is low; that is, when the switch 34 is open, the driver amplifier 84 will receive power via the transistor 92 to drive a base-emitter current through the first switching transistor 46 in relation to the amplitude of the signal received from the summing amplifier 78. The second switching transistor 50 is similarly turned off while the switch 36 between the second charging capacitor 24 and the positive terminal 14 of the power source 14 is closed by a high phase 2 clock signal on the signal path 42 and receives a base-emitter current proportional to the output of the summing amplifier 78 when the phase 2 clock signal is low. Thus, in one phase of the clock 20, the first charging capacitor 22 is connected across the power source 12 while the switching transistor 46 is turned off, to permit charging of the first charging capacitor, while the negative plate of the second charging capacitor 24 is discharged to the negative output terminal 18 at a rate that is determined by the rate at which positive charge is bled from the positive plate of the second charging capacitor 24 via the second switching transistor 50. In the second phase of the clock 20, the second charging capacitor 24 is connected across the power source 12 while the switching transistor 50 is turned off, to permit charging of the second charging capacitor, while the negative plate of the first charging capacitor 22 is discharged to the negative output terminal 18 at a rate that is determined by the rate at which positive charge is bled from the positive plate of the first charging capacitor 22 via the first switching transistor 46. Thus, with the exception of short times during transition between clock phases required for the current through a switching transistor 46, 50 to build up, electrical charge is transferred at a controlled rate between one charging capacitor 22, 24 and the negative output terminal 18, to maintain a selected negative voltage at the negative output terminal 18, while the other charging capacitor is charged from the power source 12. Variations in the voltage at the negative output terminal 18 arising from the transitions of the switching transistors 46, 50 between nonconducting and conducting states can be easily suppressed by a small filter capacitor 100 connected between the negative supply terminal 18 and the power supply ground.

OPERATION OF THE POWER SUPPLY

As described above, during the operation of the power supply 10, each of the charging capacitors 22, 24 is charged one half cycle of the clock 20 while charge is transferred between the other charging capacitor 22, 24 and the negative output terminal 18 to maintain the voltage at the negative output terminal 18 at a selected voltage. The operations of the charging capacitors is then reversed in the other half cycle. Thus, the negative output terminal can provide a negative voltage that can be applied to a load connected thereto.

During use of the power supply 10, electrical charge will be received from a load that is connected to the negative output terminal 18 so that, in effect, each of the charging capacitors 22, 24 provide a controlled voltage current sink for the load during each half cycle of operation of power supply 10. In order to provide a full appreciation of the invention, it will be useful to consider the manner in which this current sink effect is achieved.

Initially, it is contemplated that the load can be connected either between the negative output terminal 18 and the power supply ground, as indicated in dashed line at 102 in FIG. 1 so that the power supply 10 can be used for a variety of conventional applications of inverting power supplies. However, as indicated at 104 in FIG. 1, the load can equally well be connected between the positive terminal 14 of the power source and the negative supply terminal 18 so that; for example, the power supply 10 can provide a negative voltage that can be used to eliminate the arcing problem in disc drives employing magneto-resistive heads that has been described above. More particularly, a preamp (not shown) for the magneto-resistive head would be connected across the positive terminal of the power source 12 and the negative output terminal 18 as indicated by the load 104. It will be useful to describe the operation of the power source with respect to this application. In such application, power would appear across the terminals 14 and 16 of the power source, the power supply of the computer with which the disc drive is used, at such time that the computer is turned on. Concurrently, clocks in the disc drive or computer would commence operation to prove the two phase clock 20 shown in FIG. 1.

At the time the computer is turned on, the capacitors 22, 24 and 100 will generally be uncharged and the voltage at the negative output terminal will be zero; that is, at the common ground of the power supply 10 and power source 12. Thus, the level shifter 64 will provide a voltage to the summing amplifier 78 that exceeds the positive voltage that would maintain the desired negative voltage at the negative output terminal 18 for the small current that would be passed through the ballast resistor 82 for that voltage. Consequently, the summing amplifier will provide a large amplitude signal to the driver amplifiers 84 and 86 that will cause one of the amplifiers 84, 86, that which is presently receiving power from the power source 12 via one of the pnp transistor 92, 94, to provide a large base-emitter current to one of the switching transistors 46, 50. For purposes of example, it will be assumed that such switching transistor is the first switching transistor 46. Since no charge will have been previously built up on the first charging capacitor 34, the base-emitter current in the first switching transistor 46 will have no effect on the voltage at the negative output terminal 18.

However, as described above, the first switching transistor 46 receives a base-emitter current during the second phase of the clock 20 so that, as power is received from the power source 12, the switch 36 will be closed and the second switching transistor 50 will be off. Thus, a charge will be built up on the plates of the second charging capacitor 24.

Since the lack of a previous charge on the first charging capacitor 22 has no effect on the voltage at the negative output terminal 18, the amplitude of the signal at the output of the summing amplifier will remain high during the clock half cycle in which the second charging capacitor is charged. Thus, when the clock phase changes, the second switching transistor 50 will be driven into strong conduction to result in a rapid bleeding of charge from the positive plate of the second charging capacitor 24. Such bleeding will permit a transfer of charge between the negative output terminal and the negative plate of the second charging capacitor 24 that will result in the negative plate of the second charging capacitor 24 providing a sink for current from the load 104 while driving the negative output terminal 18 toward a voltage that is negative with respect to the power supply ground. Since the charging capacitors 22, 24 are charged to a voltage having a higher magnitude than the desired negative voltage, the use of even relatively small capacitors for the charging capacitors 22, 24 will permit such capacitors to sink the current from the load 104 without fully discharging so that, at the end of the first cycle of operation of the power supply 10, the negative output terminal will be at a negative voltage between that desired and ground voltage. This voltage will be maintained during switching of charging capacitors between charging and discharging modes by the filter capacitor 100 which may also have only a small capacitance. (By way of example, it has been found that suitable values for the charging capacitors 22, 24, the filter capacitor 100, and resistor 30 that will suffice for sinking an 80 ma current when the clock frequency is 125 khz, without fully discharging the charging capacitors 22, 24 and the filter capacitor 100, are 1 microfarad, 1 microfarad, 2.2 microfarad and 5 ohms respectively.)

Concurrently with the transfer of charge between the second charging capacitor 24 and the negative output terminal 18, the first charging capacitor 22 is charged by closure of the switch 34 and disablement of the driver amplifier 84 in response to the relatively high voltage for the first phase of the clock 20. Thus, when the next phase transition of the clock 20 occurs, the negative plate of the first charging capacitor 22 will provide a sink for the load current and, concurrently, drive the voltage at the negative output terminal closer to the desired negative voltage at which the negative side of the load is to be operated. Moreover, the greater the difference between this desired negative voltage and the actual voltage at the negative output terminal 18, the harder will the first switching transistor 46 be driven to transfer charge between the first charging transistor 22 and the negative output terminal 18 and load 104.

As these clock cycles repeat, the charging capacitors 22, 24 will alternately provide a current sink for the load 104 while adjusting the voltage at the negative output terminal 18 toward the negative voltage desired for operation of the load. Moreover, since the amplitude of the summing amplifier 78 output is related to the difference between the actual voltage at the negative output terminal 18 and the desired voltage, the switching transistor 46, 50 that bleeds the positive plate of a charging capacitor 22, 24 to permit the sinking of a current from the load 104 will be strongly driven while the adjustment to the desired negative voltage occurs so that the negative output terminal 18 will very rapidly be brought to the desired negative voltage. Thereafter, the switching transistors 46 and 50 will receive base-emitter currents that will just suffice to permit sinking of currents from the load 104 to the charging capacitors when the negative output terminal 18 is at the desired negative voltage.

Should the voltage at the negative output terminal 18 depart from the desired voltage during steady state operation of the power supply to sink currents to the charging capacitors 22, 24, the amplitude of the summing amplifier output will rapidly change to adjust the base-emitter current of the switching transistor 46, 50 that is currently serving to bleed a charging capacitor 22, 24 to adjust the bleeding of that charging capacitor and, consequently, provide a greater or smaller current sinking capability for that charging capacitor 22, 24 that will return the voltage at the negative output terminal 18 to the desired voltage for the load current presently being received at the negative output terminal.

As noted above, the power supply 10 can be readily adapted to compensate for large variations in the load current sinked by the charging capacitors 22, 24. For this purpose, the power supply 10 can be further comprised of a current control circuit 106 that has been illustrated in dashed lines in FIG. 2. The current control circuit 106 is comprised of a sample and hold 108 that receives the voltage at the high voltage side of the resistor 48 on the signal path 62 and samples such voltage while either of the switching transistors 46, 50 is bleeding charge from the positive plate of a charging capacitor 22, 24 and provides a signal that is proportional to the bleed current, and therefor the rate of transfer of charge to the negative output terminal 18, to an additional input of the summing amplifier 78 via a filter 110. Thus, the current control circuit provides a bias that is transmitted to the driver amplifiers 84 and 86 to increase the base-emitter currents supplied to the switching transistors 46 and 50 when a larger current demand is made on the power supply 10.

To provide sampling of the bleed current; that is, the collector current of the presently conducting switching transistor 46, 50, two one shots 109, 111 are connected to one phase of the clock 20; for example, the second phase, as has been illustrated by the connection of the inputs to the one shots 109, 111 to the clock signal path 42 via a signal path 112 in FIG. 2. The one shot 111 has an inverting input so that it will respond to a low to high transition of the second clock phase while the one shot 109 responds to a high to low transition of the second clock phase. In response to these transitions, the one shots 109, 111 each deliver a momentary positive pulse to an inverting input of an AND gate 114 so that the AND gate 114 will be momentarily disabled at the start of each half cycle of operation of the clock 20. The output of the AND gate is connected to the sample and hold 108 to initiate a sample period each time the output of the AND gate goes high. Consequently, during transfer of charge between the negative plate of either charging transistor 22, 24 and the negative output terminal 18, the collector current of the switching transistor 46, 50 that is bleeding the positive plate of the charging capacitor is continuously sampled and such sample is held while transitions in the clock phases occurs. Thus, the sample and hold 108 provides a signal to the summing amplifier that is proportional to the current demand placed on the power supply 10 by a load that is driven by the power supply 10 to provide a bias to the driver amplifiers 84 and 84 that will cause the switching transistors to bleed the positive plates of the charging capacitors 22, 24 at a rate to maintain the load current sinked by the charging capacitors 22, 24. Consequently, the regulation provided by the transmittal of the voltage at the negative output terminal 18 to the level shifter 64 and thence to the summing amplifier 78 need compensate only for variations in the voltage at the negative output terminal 18 from the desired voltage to provide rapid correction for such variations.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A power supply, operable from a two-phase clock and a power source that provides a positive voltage relative to a power supply ground at a power source positive terminal, for providing a regulated negative supply voltage with respect to said power supply ground to a negative output terminal of the power supply, comprising:

a first charging capacitor having a positive and a negative plate;

a second charging capacitor having a positive and a negative plate;

a filter capacitor connected between the power supply ground and the negative output terminal; and switching means, responsive to signals received from said clock, for alternately connecting one charging capacitor between the power source positive terminal and the power supply ground to negatively charge the negative plate of said one charging capacitor while transferring charge from the negative output terminal to the negative plate of the other charging capacitor, the switching means comprising:

charge transfer control means responsive to the voltage at the negative output terminal of the power supply for controlling the rate of transfer of charge between the negative output terminal and said other charging capacitor so as to maintain a substantially constant negative voltage at the negative output terminal of the power supply;

first and second switching transistors, connected to the positive plates of the first and second charging capacitors, for providing a discharge path to ground for charge stored on the positive plates of the first and second charging capacitors; and diodes connected between the negative output terminal and the negative plates of the first and second charging capacitors to provide a unidirectional current path from the negative output terminal to the negative plates of the first and second charging capacitors;

wherein the charge transfer control means is further characterized as a means for controlling the base emitter currents of the first and second switching transistors.

2. The power supply of claim 1 wherein the charge transfer control means further comprises current control means for adjusting the rate of transfer of charge between the negative supply terminal and the charging capacitors in relation to collector currents of the switching transistors.

3. A low-noise negative voltage power supply for a magneto-resistive head in a disc drive, the disc drive having a power source for providing a positive voltage with respect to ground and a two phase clock providing alternating clock signals at a selected frequency, the power supply comprising:

a negative voltage output terminal for providing a negative voltage;

a first capacitor having a negative and a positive charging plate;

a second capacitor having a negative and a positive charging plate;

a filter capacitor operably connected between the negative voltage output terminal and ground;

first and second switches for connecting the power source to the positive charging plates of the first and second capacitors in response to the alternating clock signals from the two phase clock, wherein the first and second capacitors are alternately charged by the power source for period of times corresponding to the frequency of the alternating clock signals;

first and second switching transistors, connected to the positive charging plates of the first and second capacitors, for controllably providing discharge paths for charge stored on the positive charging plates of the first and second capacitors;

a charge transfer control circuit, connected to the power source, the two phase clock, the negative voltage output terminal and the first and second switching transistors, for controlling the base emitter currents of the first and second switching transistors in response to the magnitude of the negative voltage on the negative voltage output terminal; and diodes connected between the negative voltage output terminal and the negative charging plates of the first and second charging capacitors to provide unidirectional current paths from the negative output terminal to the negative plates of the first and second charging capacitors;

wherein one of the first and second capacitors is charged while the other is controllably discharged so that charge flows from the negative output terminal to the negative charging plate of the discharging capacitor to provide the negative voltage on the negative voltage output terminal.

4. The power supply of claim 3, wherein the charge transfer control circuit further comprises current control means for adjusting the rate of transfer of charge from the negative voltage output terminal to the negative plate of the discharging capacitor in relation to the collector current of the corresponding first and second switching transistor.

* * * * *